United States Patent
Ritz et al.

(10) Patent No.: US 10,261,663 B2
(45) Date of Patent: Apr. 16, 2019

(54) MANDATORY COMMENT ON ACTION OR MODIFICATION

(71) Applicant: WORKIVA INC., Ames, IA (US)

(72) Inventors: Dean Anthony Ritz, Vashon, WA (US); Willie Eide, Bozeman, MT (US); Ephie Risho, Bozeman, MT (US)

(73) Assignee: Workiva Inc., Ames, IA (US)

(*) Notice: Subject to any disclaimer, the term of this patent is extended or adjusted under 35 U.S.C. 154(b) by 481 days.

(21) Appl. No.: 14/868,655

(22) Filed: Sep. 29, 2015

(65) Prior Publication Data

US 2017/0083500 A1    Mar. 23, 2017

Related U.S. Application Data (60) Provisional application No. 62/219,896, filed on Sep. 17, 2015.

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04842* (2013.01); *G06F 17/241* (2013.01); *G06F 17/246* (2013.01); *G06Q 10/101* (2013.01)

(58) Field of Classification Search
CPC ...................................................... G06F 21/10
See application file for complete search history.

(56) References Cited

U.S. PATENT DOCUMENTS

| | | | |
|---|---|---|---|
| 5,140,521 A | 8/1992 | Kozol et al. | |
| 5,917,489 A * | 6/1999 | Thurlow | G06Q 10/107 706/45 |

(Continued)

FOREIGN PATENT DOCUMENTS

WO    2014/169334 A1    10/2014

OTHER PUBLICATIONS

Gurnett, "How to Track Changes in Google Docs: Using the Suggest Edits Feature," The Write Life, <http://thewritelife.com/google-docs-adds-track-changes-editing-heres-use/>, May 16, 2015, 10 pages.

(Continued)

*Primary Examiner* — Claudia Dragoescu
(74) *Attorney, Agent, or Firm* — Drinker Biddle & Reath LLP (57) ABSTRACT

A method requires a mandatory comment in a software productivity tool, comprising: opening in the software productivity tool a document stored in a non-volatile hardware data storage device; receiving a definition of an actionable data item of the document; receiving a request for an action associated with the item; determining if the action triggers a predefined comment rule; if triggered, then: requiring a mandatory comment; storing the accepted entered comment in the non-volatile hardware data storage device; and performing the requested action. A method specifies a mandatory comment, comprising: receiving a definition of an actionable data item of the document; receiving a definition of a comment rule related to an action on the item; receiving a definition of a comment criteria associated with the comment rule; and storing the actionable data item, the triggering criteria, and the comment criteria in a non-volatile storage device of a hardware device.

16 Claims, 7 Drawing Sheets

(51) Int. Cl.
    *G06F 3/0484* (2013.01)
    *G06F 17/24* (2006.01)
    *G06Q 10/10* (2012.01)

(56) References Cited

U.S. PATENT DOCUMENTS

| | | |
|---|---|---|
| 7,653,879 B1 * | 1/2010 | Sareen ............ G06Q 10/107 |
| | | 715/708 |
| 7,689,578 B2 | 3/2010 | Albornoz et al. |
| 8,965,983 B2 | 2/2015 | Costenaro et al. |
| 2004/0163050 A1 | 8/2004 | Matter |
| 2007/0220068 A1 * | 9/2007 | Thompson .......... G06F 21/6218 |
| 2007/0250509 A1 * | 10/2007 | Marti ................ G06F 17/241 |
| 2008/0059539 A1 | 3/2008 | Chin et al. |
| 2008/0177994 A1 | 7/2008 | Mayer |
| 2009/0006454 A1 | 1/2009 | Zarzar et al. |
| 2009/0172558 A1 | 7/2009 | Pickens et al. |
| 2012/0133989 A1 | 5/2012 | Glover |
| 2014/0033088 A1 | 1/2014 | Shaver |
| 2014/0157103 A1 | 6/2014 | Lee |
| 2014/0173423 A1 | 6/2014 | Meisels et al. |
| 2014/0372370 A1 | 12/2014 | Massand |
| 2015/0012528 A1 | 1/2015 | Kapadia |
| 2015/0113390 A1 | 4/2015 | Vagell et al. |

OTHER PUBLICATIONS

Microsoft Inc., "Track changes," <https://support.office.com/en-us/article/Track-changes-197ba630-0f5f-4a8e-9a77-3712475e806a>, 2013, 2 pages.

* cited by examiner

| | A | B | C | D | E | F | G | H |
|---|---|---|---|---|---|---|---|---|
| 1 | ASSETS | | 6/26/2010 | 12/26/2009 | 9/26/2009 | 6/27/2009 | 3/28/2009 | 12/27/2008 |
| 2 | Current assets | | | | | | | |
| 3 | Cash and cash equivalents | $ | 510,482 | 664,999 | 364,814 | 429,169 | 624,932 | 716,218 |
| 4 | Marketable securities | | 283,993 | 220,236 | 158,847 | 160,734 | 172,176 | 76,042 |
| 5 | Restricted cash and investments | | — | — | 348,265 | 48,970 | — | — |
| 6 | Accounts receivable trade, net | | 256,344 | 225,626 | 178,632 | 353,266 | 184,790 | 61,793 |
| 7 | Accounts receivable, unbilled | | 105,333 | 5 | — | — | — | — |
| 8 | Inventories | | 156,308 | 152,823 | 58,803 | 162,501 | 131,468 | 121,554 |
| 9 | Project assets | | 169 | 108 | — | — | — | 668 |
| 10 | Deferred tax asset, net | | 19,238 | 22,679 | 18,362 | 14,880 | 11,658 | 9,822 |
| 11 | Prepaid expenses and other current assets | | 244,053 | 164,071 | 79,355 | 76,996 | 102,421 | 91,294 |
| 12 | Total current assets | | 1,615,870 | 1,310,271 | 1,203,392 | 1,244,487 | 1,227,445 | 1,077,401 |
| 13 | Property, plant and equipment, net | | 1,094,877 | 988,732 | 962,732 | 911,869 | 887,669 | 842,623 |
| 14 | Project assets | | 146,065 | 131,415 | 102,693 | 113,680 | 61,987 | 61,325 |
| 15 | Deferred tax asset, net | | 157,778 | 130,315 | 117,449 | 102,673 | 14,460 | 29,559 |
| 16 | Marketable securities | | 164,017 | 120,668 | 306,415 | 138,239 | 14,460 | 30,035 |
| 17 | Restricted cash and investments | | 81,103 | 36,484 | 37,173 | 33,695 | 30,148 | 30,039 |
| 18 | Investment in related party | | 25,000 | 25,000 | 25,000 | 25,000 | 25,000 | 25,000 |
| 19 | Goodwill | | 265,515 | 266,515 | 284,985 | 294,962 | 33,829 | 33,829 |
| 20 | Inventories | | 30,653 | 23,665 | 13,434 | 6,273 | — | — |
| 21 | Other assets | | 35,435 | 46,217 | 44,786 | 39,361 | 15,644 | 14,707 |
| 22 | Total assets | $ | 3,611,317 | 3,089,818 | 3,095,072 | 2,910,173 | 2,326,173 | 2,114,302 |

200

MANDATORY COMMENT ON ACTION OR MODIFICATION

CROSS REFERENCE TO RELATED APPLICATIONS

The present application claims the benefit of U.S. Provisional Application No. 62/219,896, filed Sep. 17, 2015, entitled, "Mandatory Comment on Action or Modification", herein incorporated by reference.

TECHNICAL FIELD

The present disclosure is related generally to a system and method for commenting in documents and, more particularly, to a system and method for enforcing mandatory comments when an action, including modification, is taken on the document or other actionable item.

BACKGROUND

Productivity software may generally be categorized as software that simplifies editing digital information e.g., file management software for managing files and directories, word processing software for editing documents dominated by text, spreadsheet software for editing spreadsheets, code editors for editing the instructions of a software program. Many of these systems provide mechanisms for users to record and preserve comments on the digital information.

For some digital information, these comments comprise documentation for audits and other retrospective purposes. Historically, such commenting features are voluntary, i.e., the user editing the document makes a decision as to whether to associate a comment with the document. Further, comment entry mechanisms are not automatically triggered or event-driven. The user decides when to create and on what to apply a comment, thus adding to the documentation that may be useful for retrospective purposes.

However, this creates a problem when the user fails to voluntarily enter a comment in a place where such a comment would be needed or even required. For example, in a financial document such as a spreadsheet, an important value may be changed. It may be highly desirable to know the basis for the value change—however, if the user neglects to add a comment, valuable and possibly necessary information about the change is lost. Given this problem, a way is needed to require a mandatory comment that persists with the document or digital information when certain actions take place.

SUMMARY

The problem whereby such documentation lacks information on major actions associated with changes to the digital information is solved by requiring the user to comment at the time of the major change, and associating that comment with the digital information of interest.

DEFINITIONS

As defined herein, a document ("document") may be a human-readable presentation of a data item or items whose inclusion, exclusion, rendering, and value within the document are maintained by a manual process administered by the user, an automated or computer-assisted process that generates some or all attributes of the data items, or a combination of manual and automated processes. In one sense, a document may be viewed as a portal, carrier, container, or even shell for one or more data items, including other documents as defined herein.

A data item ("data item") may be any digital entity or digital information at any hierarchical level in a document including a document itself. For example, the data item could be a letter, string of characters, word, field, sentence, paragraph, section, the document itself, etc. For a worksheet document, the data item could be a number, cell, cell group, column, row, worksheet, chart, graph, figure, or entire workbook or spreadsheet document. A data item may also be any collection or grouping of any of these, including, recursively, other data items. It can also be used to define specific instances of digital entities/information as well as classes or general descriptions of such entities/information.

An actionable data item ("actionable data item") is a data item upon which an action, such as add, change, delete, is requested.

A rule ("rule") governs conditions under which a particular state is determined to be achieved, a requirement is determined to be sufficient or satisfied, or a consequent action is triggered to be performed.

A comment rule ("comment rule") is a rule that determines whether a mandatory comment is required or not in a particular situation".

An owner ("owner") is a user with authority to define a rule.

An editor ("editor") is a user who edits or modifies a data item.

The comment data item ("comment data item") is the data item to which a provided comment is associated.

A selection data item ("selection data item") is a data item that is used to identify an actionable data item or a comment data item.

A link ("link") is a machine readable reference to a data item. It minimally identifies (1) a target system and (2) a target system-specific reference that the target system uses to identify a specific data item within.

A method for requiring a mandatory comment in a software productivity tool, comprising: opening a document stored in a non-volatile hardware data storage device in the software productivity tool on a graphical user interface (GUI) of a hardware device; receiving a definition of an actionable data item of the document; receiving a request for an action associated with the actionable data item; determining if the action triggers a predefined comment rule; if the comment rule is triggered, then: requiring a mandatory comment; performing a post-request action that is one of: a) accepting an entered comment pursuant to the requested mandatory comment; b) queuing a task requiring a later entering of a mandatory comment; and c) rejecting the entered or a non-entered comment by performing an inadequate comment action; if the post-request action is (a) or (b), then storing the accepted entered comment in the non-volatile hardware data storage device; and performing the requested action.

A method for specifying a mandatory comment, comprising: receiving a definition of an actionable data item of the document; receiving a definition of a comment rule related to an action on the actionable data item; receiving a definition of a comment criteria associated with the comment rule; and storing the actionable data item, the triggering criteria, and the comment criteria in a non-volatile storage device of a hardware device.

DESCRIPTION OF THE DRAWINGS

While the appended claims set forth the features of the present techniques with particularity, these techniques, together with their objects and advantages, may be best understood from the following detailed description taken in conjunction with the accompanying drawings illustrating exemplary embodiments of which:

DETAILED DESCRIPTION

Figure 1:
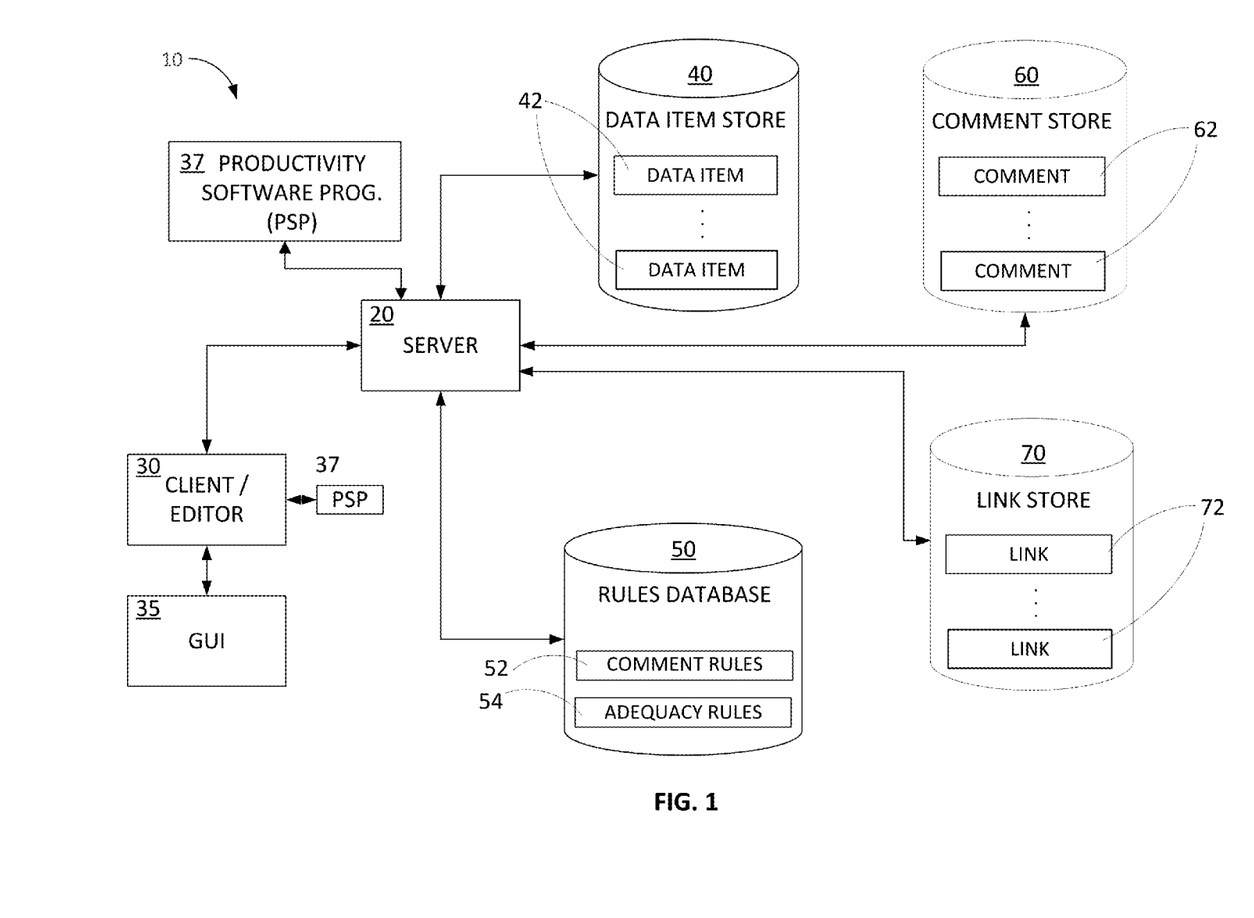
FIG. 1 is a block diagram illustrating the basic components of the system.

FIG. 1 is a block diagram illustrating the basic components of the document editing system 10. A server 20 functions as the interface between a client/editor computer or device 30 having a graphical user interface 35, a data item store 40, a rules database 50, a comment store 60, and a link store 70. The data item store 40 contains a plurality of data items 42 that can each have associated user-provided comments 62. The data item 42 may be edited by a productivity software program 37 that may reside on the server 20, the client 30, or have components on both. The rules database 50 contains comment rules ("comment rules") 52 that govern conditions under which a mandatory comment is demanded, and adequacy rules ("adequacy rules") 54 that govern whether a user provided mandatory comment is satisfactory in a particular situation. The comment store 60 contains comments 62 that are associated to data items via links 72 in the link store 70. Although the rules database 50 and the respective comment rules 52 and adequacy rules 54, and the comment store 60 and comments 62, and the link store 70 and links 72, are shown as separate from the data item store 40 and respective data items 42 stored therein, these rules 52, 54, and comments 62, and links 72, can actually be stored with the data items themselves or their respective database and stores reside in the same storage area or even the same file as the data items. This is discussed in more detail below.

Figure 2:
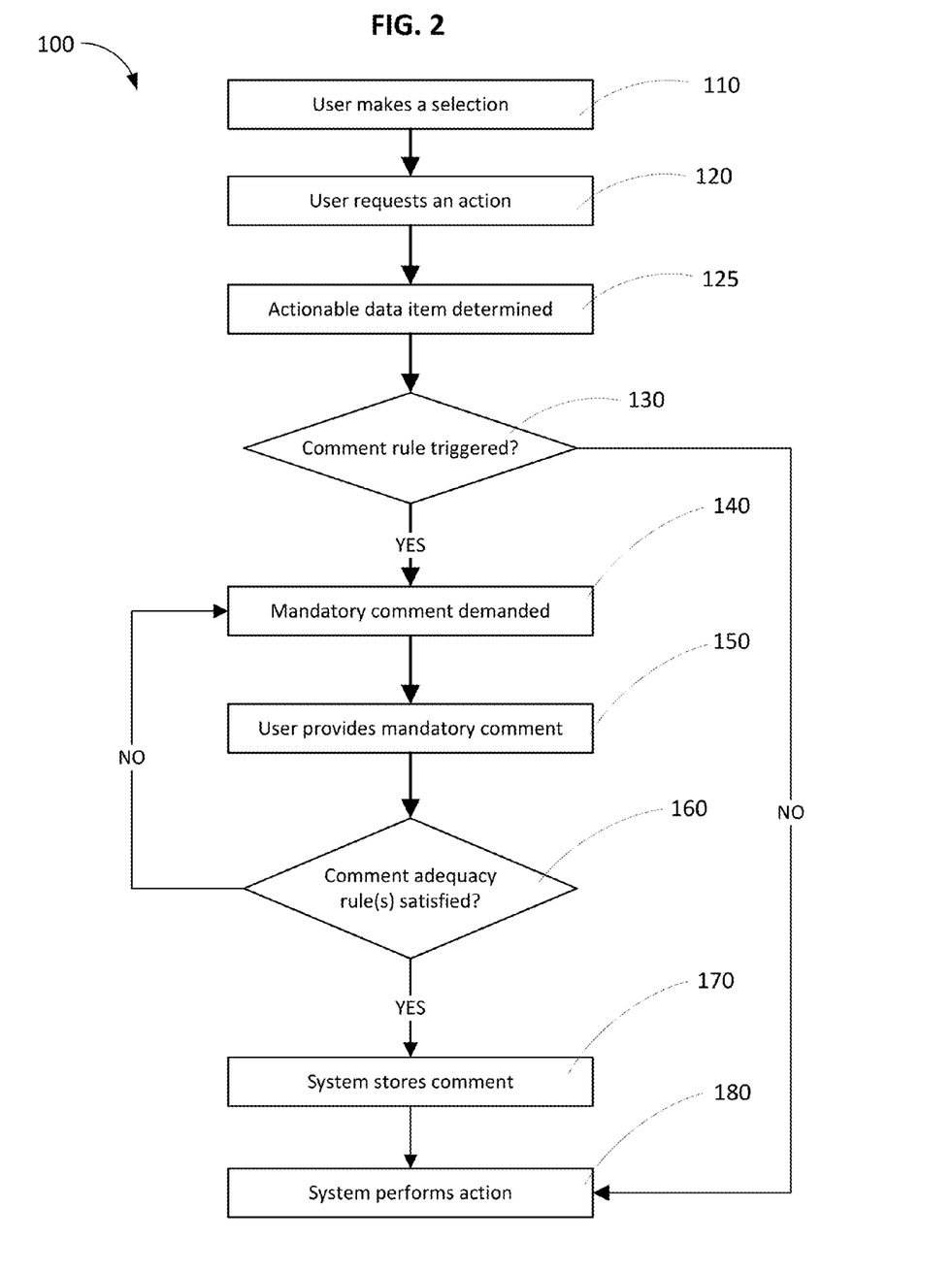
FIG. 2 is a flowchart illustrating an example use case.

FIG. 2 is a flowchart illustrating the basic flow 100 of the user's experience. As common in productivity software, modeled on selecting an object then invoking an action, the user makes a selection 110 on which to invoke an action. For example, this selection may be as simple as selecting an insertion point in which to enter text, the selection of a sequence of characters or paragraphs, the selection of a cell or range of cells in a spreadsheet, or a file or set of files in a file manager, etc. The user may also make a selection indirectly or through a proxy such as when a user specifies a search and replace operation. In this case the search action makes the selection, and the user has used the search command to make the selection by proxy. Although the user may create a "selection" of a region for purposes of the search, the ultimate selection in this case are the matches to the string of characters that is to be replaced. This could also be viewed as allowing for a two-tiered selection and action—in this instance: tier-one is a selected region and the action is a search within this region for data items matching a specified criteria, and tier-two is a "result of the selection" selection, and the action is a "replace").

Figure 3:
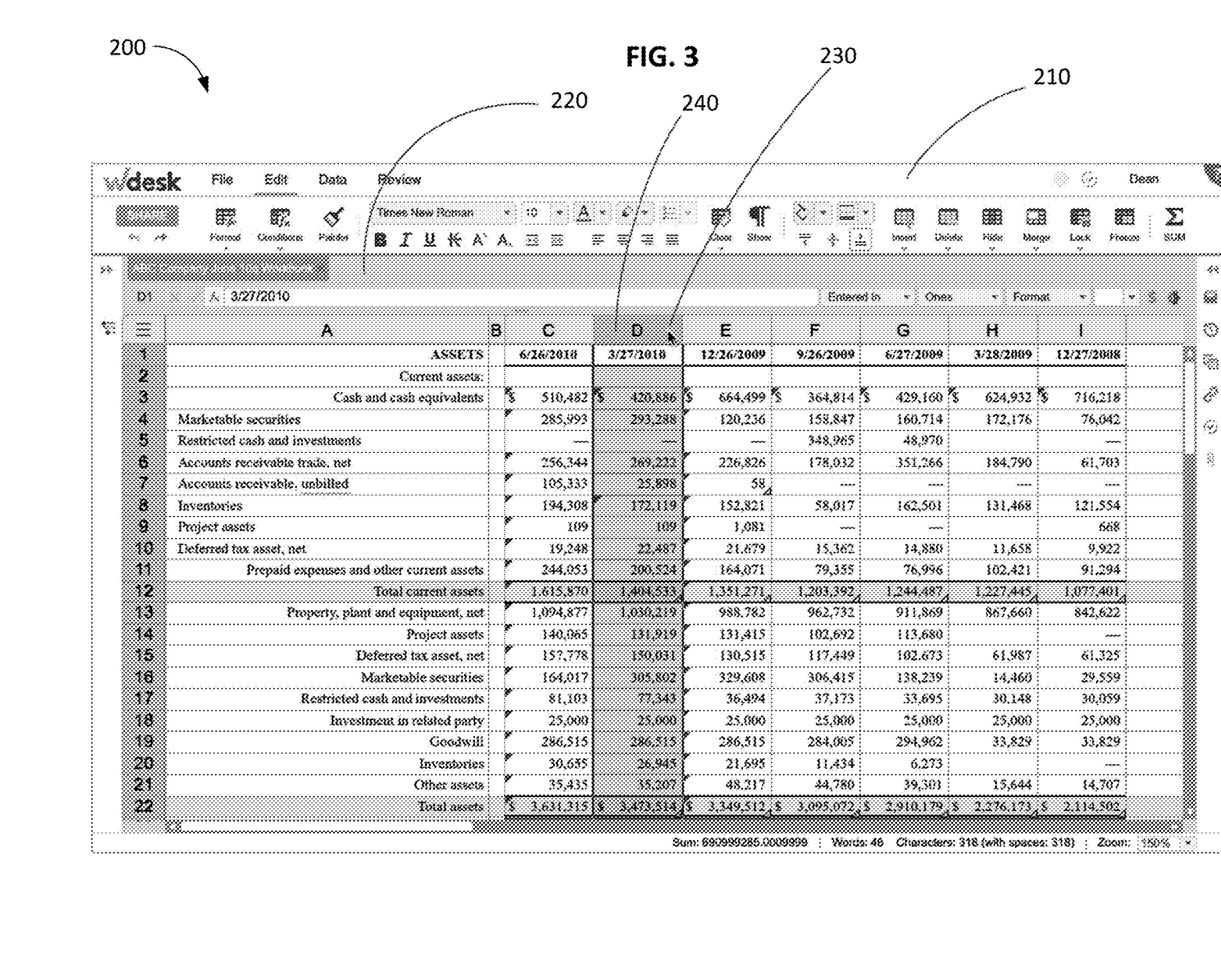
FIG. 3 is a screen shot displaying an example worksheet to which a change will be made, and illustrating a selected column of the worksheet.

For purposes of this description, the user has used a graphical user interface 35 to select a column in a spreadsheet (see FIG. 3 230). Through user effort, the user requests an action 120 be performed based on the selection from the selection procedure 110; for purposes of this description, the user requests the deletion of the spreadsheet column (see FIG. 4 260).

The selection 110 and the requested action in procedure 120 are used to identify the actionable data item in procedure 125. Although here the selection is the actionable data item (as will often be the case), the selection isn't always the object of the requested action. In an alternative example to demonstrate this, instead of requesting the deletion of the spreadsheet column as above, our user instead selects "Insert Column Right" (see, e.g., FIG. 4 265). In this alternative example, it is the table containing the selected column that is the actionable data item acted upon and modified by the requested action 120, and not the selected column.

Returning to our example, the requested action in procedure 120 and the actionable data item 125 is tested against comment rules 52 to see if any comment rule triggers 130 i.e., a comment rule's criterion are met. If no comment rules trigger 130: NO, the requested action 120 is performed 180, and the system carries on normal processing. If a comment rule triggers 130: YES, a mandatory comment is demanded of the user 140. The user provides a comment 150. The comment may be tested as satisfactory 160 for adequacy rules 54, and, if satisfactory 160: YES, the comment 62 is stored 170 in a manner that it is associated with the comment data item, that is, the data item(s) 42 to which the comment relates. The requested action 120 is then performed 180, and the system carries on normal processing. If the comment is not satisfactory 160: NO, a mandatory comment may again be demanded 140. This cycle may continue until a satisfactory comment is provided or the user rescinds the requested action.

FIG. 3 shows a display screen 200 of an example productivity software program 210 loaded with a spreadsheet document 220. In FIG. 3, the user makes a selection 230 (FIG. 2 110), in this case a spreadsheet column 230 with the date "3/27/2010" in its column header 240, by using, e.g., a mouse pointer feature of the graphical user interface 35. In other embodiments, the mechanisms whereby a user makes a selection may reflect the type of data, and the user experience designed into the productivity software program; for example, a selection may be performed through a keyboard command, a fingertip on a touchscreen display, etc.

Figure 4:
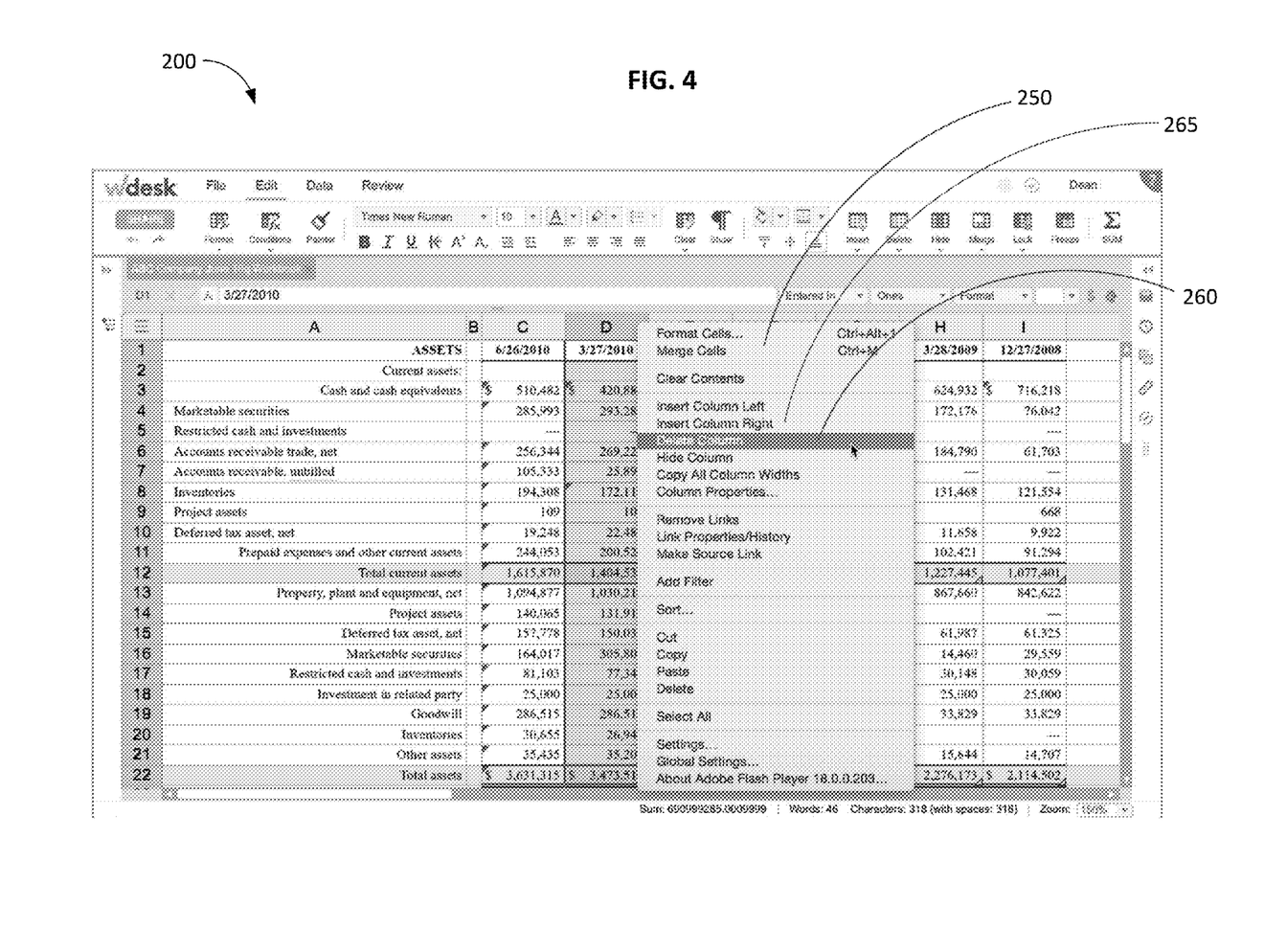
FIG. 4 is a screen shot illustrating a user electing to delete the worksheet column.

In FIG. 4 the display screen 200 illustrates invoking an operation on the selection 230. In this example, the user uses the graphical user interface 35 to select the "Delete Column" action 260 from a menu of available commands 250 (FIG. 2 120). In other embodiments, the mechanism for selecting an action reflects the type of data, and the user experience designed into the productivity software program. The requested action 260 to delete the selection 230 indicates that the spreadsheet column 240 is the actionable data item (FIG. 2 125). The requested action 260 to delete the data item 125 triggers a comment rule 52 (FIG. 2 130: YES)— such as "if spreadsheet column is deleted" or "if spreadsheet data item with calculated data is deleted"—and a comment is therefore demanded (FIG. 2 140).

Figure 5:
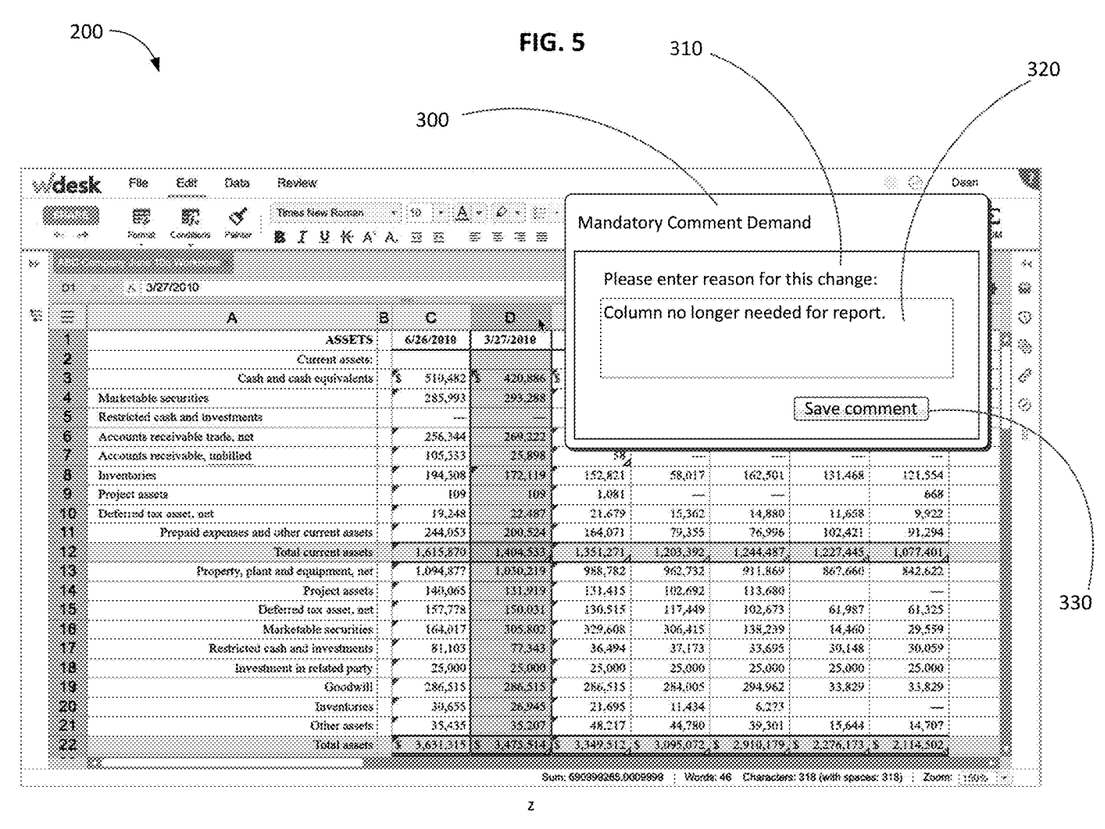
FIG. 5 is a screen shot illustrating a dialog box that requires a mandatory comment.

In this example, as shown in FIG. 5, the comment demand is presented as a dialog window 300, but in other embodiments it may be presented as a panel to the main window of the productivity software 210, it could be an audio request played through the computer's audio system with the comment being spoken by the user and recorded by the computer, etc. A message 310 may be presented to the user related to the comment, whereby such message may be generic or specific to the data item, the comment rule, or the adequacy rule(s). In this example, the user enters their comment as text in a comment entry field 320, though other embodiments may accept comments in other forms such as audio, video, completion of a form, etc.

The user submits their comment via, e.g., a save button 330, and the comment may then be tested as satisfactory (FIG. 2 160) for adequacy rule(s) 54. Such adequacy rules 54 could be very simple, e.g., a particular minimal number of characters, or quite complex, e.g., looking for context-relevant words related to the user's action (for example, use of the word "delete" for actions involving deletion). If the comment 62 is satisfactory (FIG. 2 160: YES) it is stored (FIG. 2 170) in the comment store 60, and a link 72 is created in the link store 70 to relate the comment 62 to the comment data item 42.1, and the requested action is performed (FIG. 2 180). The action may be performed synchronously or asynchronously with the logically consequent link and comment storage activities.

Figure 6:
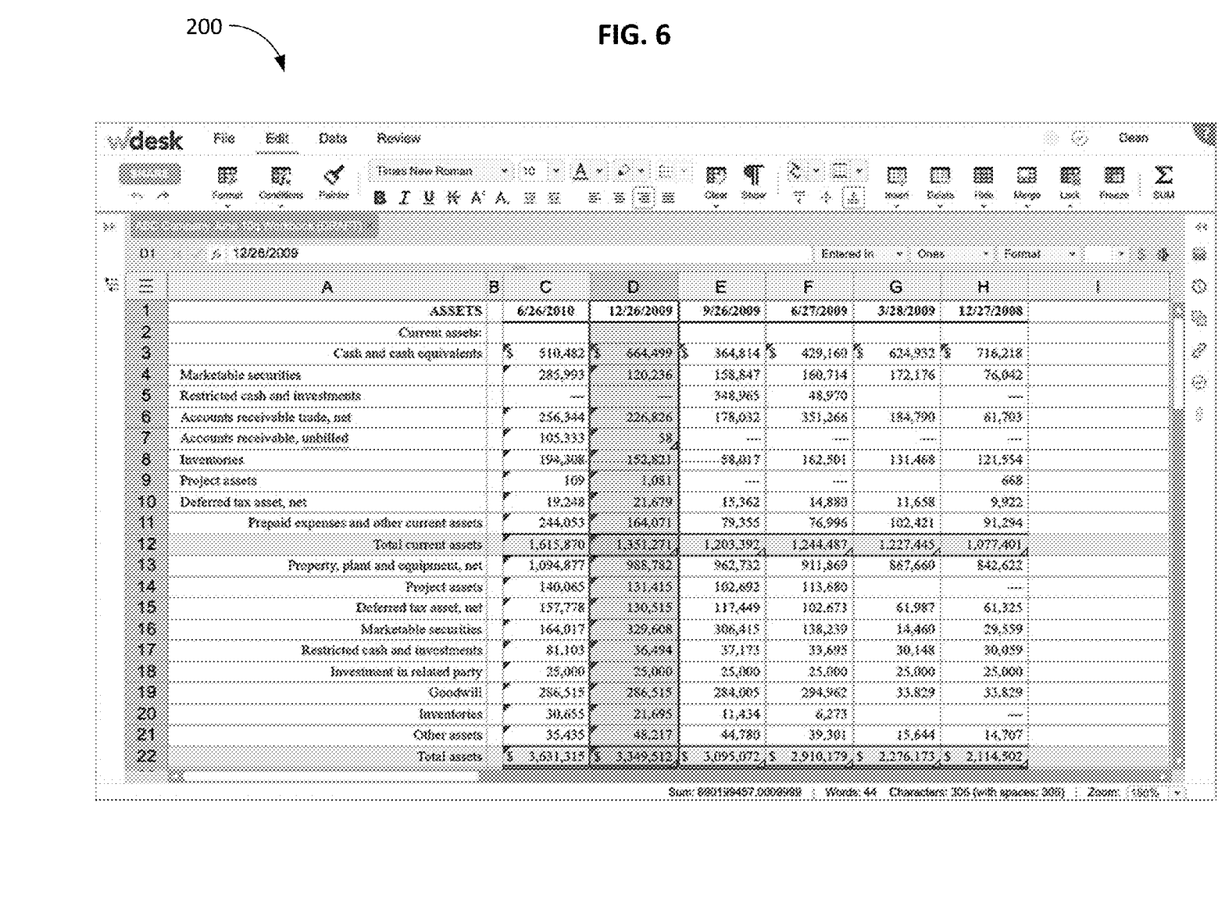
FIG. 6 is a screen shot illustrating the worksheet after the column has been deleted and the mandatory comment entered.

As earlier noted, a link is a machine readable reference to a data item. It minimally identifies (1) a target (of the link) data store ("target data store") and (2) a target data store-specific reference that the target data store uses to identify a specific data item within. The identification of the target data store may be implied or explicit. An example of the former occurs within an HTML document where an anchor to another document location is such a link which implies the target system is HTML as well as within the same HTML document. The latter, with an explicit identification of the target system, allows this system and method to associate comments 62 with data items 42 in a variety of data item stores 40 systems. The link hides the implementation details of the target system as the PSP 37, through the server 20, only has to deliver the target-specific reference to the target data item store 40; what happens within the target system is completely independent of the PSP 37. As one example of a target system-specific reference a URL is one conforming approach in that an "http:" prefix identifies the system which then uses the remaining text of the URL to identify the data item. As another example, the link may be coordinates for a selection within a document data item that can be identified in a coordinate-based manner as described in U.S. patent application Ser. No. 14/795,514, filed Jul. 9, 2015, ("the '514 Application") herein incorporated by reference. As yet another example a comment 62 is associated with a data item contained within a causal tree structure as described in U.S. patent application Ser. No. 14/808,029, filed Jul. 24, 2015, ("the '029 Application") herein incorporated by reference. In a causal tree, the comment may be stored as an instruction whose value is a link 72. Alternatively, the comment may be stored as an instruction whose value is the comment itself, and the reference ID to that instruction serves as the link 72. This is an example where the link 72 and the comment 62 are stored directly with a data item 42 in the data item store 40. In some embodiments, a link is a unidirectional structure in that it represents a single machine readable reference to a data item. In other embodiments it is bi-directional i.e., two reference data items, and which in some embodiments also notes directionality (i.e., from and to). In still other embodiments, the link represents machine readable references to a plurality of data items. Continuing with our example on the deletion of a column within a spreadsheet, the result may be seen in the display 200 of FIG. 6 where spreadsheet column with the date "3/27/2010" in its column header has been removed, and the columns to the right have shifted over one column to the left.

Other variations can be considered with respect to the above described example scenario. For example, in FIG. 5, the action may be performed prior to the commenting (i.e., after an inadequate comment, but prior to a final full/compliant comment). In this embodiment, the failure to provide an adequate comment would not preclude the action, but the other mechanisms for ensuring adequate comment entry or reporting as described herein may be utilized. In other embodiments, a mere warning may be given to the user and/or the comment may be flagged in some manner as unsatisfactory and the system may proceed with storing the (unsatisfactory) comment at 170.

The selection 110 or actionable data item could be a table in a document, a range of text, a folder (in a file manager), a file (in a file manager), a time range in an audio/video recording, a graphic selection area, etc. The above example illustrated the selection of a column (data range), in a spreadsheet. The following describes how a comment rule and the comment data item to which it applies may be defined. A comment rule is composed of three properties: the actionable data item(s), the action(s) and optional threshold(s), and the adequacy rule(s).

The actionable data item may by a specific data item or a class of data items. Examples of the former include a user selection of a particular cell in a table, range of cells in a spreadsheet, a particular paragraph, a particular file in a file manager, etc. Any conventional selection mechanism can be utilized at this point. Examples of the latter include all data items of a particular type (e.g., text, number, type of number such as monetary); document type (e.g., spreadsheet). Each of these may be further refined by criteria based on the value of the data item (e.g., all numeric values >500).

The action specifies the change to the actionable data item and the optional threshold of that action, if applicable. An action is a user-specific instruction that results in the change of a data item. Because it impacts a data item, the choice of actions is limited by the data item type, for example the action "Insert column right" is applicable to a table but not to a string of characters. Therefore, the choice of available actions may be limited to just those allowable for the comment rule's specified actionable data item. Thresholds may be optional when the action just happens e.g., deletion. A more complex action, for example, is the changing of a numeric value by more than a fixed amount (e.g., >50) or a relative amount (e.g., >50%), deleting >100 characters in a paragraph, changing permissions on a file, changing a filename, etc. Thresholds may be gathered into logical relationships conjoined by logical operators such as AND and OR. The ability to set the comment rules/criteria may be set by the user or at the account level e.g., only those having a particular attribute, such as a role of owner, can establish the comment rules. The rules and operative scope can be selected from various menus, and data entry fields (i.e., a comment rule editor), and can range from simple to complex. Any known mechanism for permitting the entry of formulas can be utilized here as well.

In addition to the comment rules, additional rules may be defined for determining the adequacy of the comment. In terms of the adequacy rules 54, just as with the comment rules, any number of criteria can be defined. To define these rules 54, an adequacy rule editor could be provided that allows one to select from a pick list of comment satisfaction requirements or define new ones. For example, an adequacy rule 54 might require the comment to be more than one hundred characters long, and/or all words being acceptable by a spell check. The adequacy rules could utilize a form comprised of multiple fields, each of which may have its own comment satisfaction criteria, or could require an audio and/or video recording (via computer's camera and microphone) of a minimum length. The adequacy rules could be related to an attribute of the comment (e.g., length) or its content (e.g., keywords present), and these rules could also be context dependent.

In addition to storing the comment, other related consequent actions besides the user-requested action could be performed as well. For example, the system could notify the document owner(s), or generate a review task, in a manner as described in the '514 Application.

One problem that occurs when the action performed on a data selection is a deletion action is that it is difficult to associate the comment with non-existent (deleted) data.

In an accretive editor, such as that described in U.S. patent application Ser. No. 14/808,029, filed Jul. 24, 2015, where instructions for all edits are preserved, or a system that automatically versions documents, these comments may be associated with the appropriate version or data item-state in time (accretive model). Given the hypothetical case where a comment rule is set on a cell for any change in the cell's value, and a sequence of actions whereby that cell has gone through five changes in its value, the system will require a comment for each of the five actions. A retrospective inspection of that cell would reveal this sequence of actions and the user's (or users') reason(s) for each action.

With regard to the special case of deletion, this can be easily handled in the accretive model by adding a comment to the delete instruction itself. For a conventional version-based system, the deletion action and associated comment could be attached to the last version with that deleted data item in place. In that case, it may be that retrospective discovery must be done on the data item containing the deleted datum (e.g., the document that once contained the deleted paragraph). Alternately, the comment can be anchored to a currently existing location in the document immediately preceding (or succeeding) the deleted data item, region, first item in a collection, etc. In an embodiment, retrospective comments may be discoverable for a particular data item and optional for its components i.e., data referenced or contained by the data item.

The following case study illustrates a full process of defining criteria for a document by a first user, performing a triggering action with respect to the document, and then following through with the mandatory commenting.

A first data item 42 is the document 3Q2015RPT represents a third quarter 2015 financial report. Using a productivity software program 37, a first user USER1 creates a second data item 42 which is the document 4Q2015RPT that represents a subsequent fourth quarter 2015 financial report by duplicating the first document 3Q2015RPT. Although in one embodiment, comment rules 52 and/or adequacy rules 54 may follow a duplicate of the original data item with which the comment/adequacy 52, 54 rules are associated, in the present example, duplicating the document does not carry forward the comment or adequacy rules—therefore USER1 should define the wanted comment rule(s) 52 and adequacy rule(s) 54.

USER1, as the data item 42 owner, defines the following triggers 52 (in an embodiment, the right to create a new comment rule 52, the right to assign already-defined comment rules 52, and the right to modify or delete comment rules 52, may be restricted by permissions/rights granted to a user or type of user).

Figure 7:
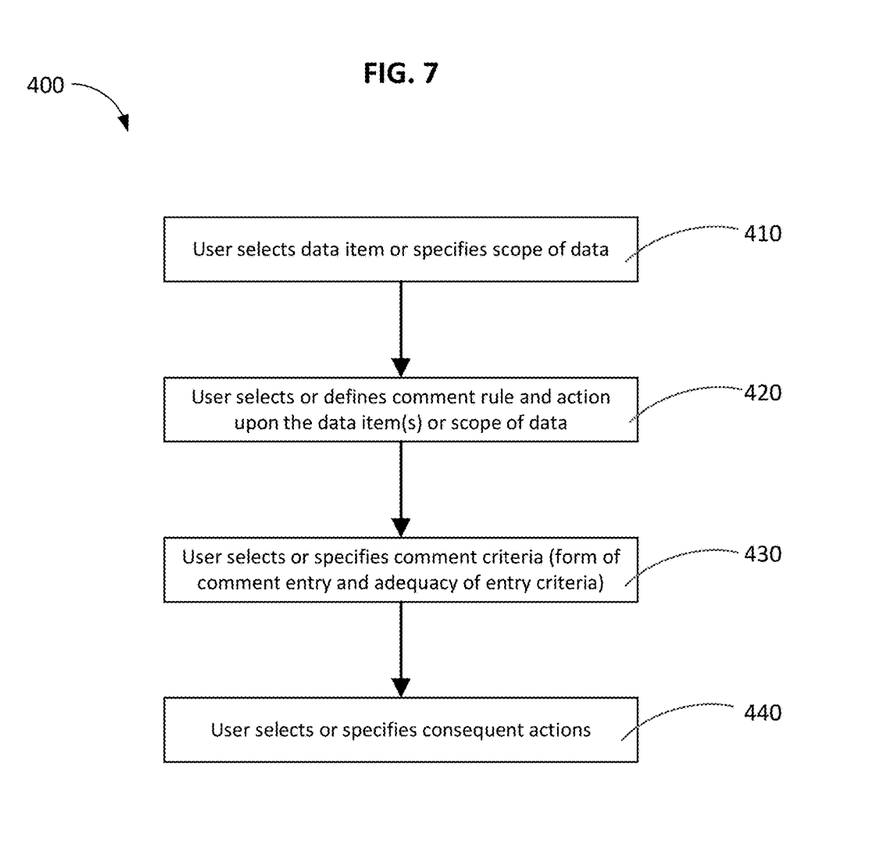
FIG. 7 is a flowchart illustrating the creating of a comment rule and action related to the mandatory comment.

Referring to FIG. 7, the process 400 begins with USER1 selecting the data item or specific scope of the data 410. For a first comment rule TRIG1, USER1 selects a number of paragraphs and tables spanning several pages in the document 4Q2015RPT 410. USER1 then defines the comment rule TRIG1 420, the TRIG1 comment rule 52 stating that any change in value of a number in text (but not in a table) triggers the comment rule. Then, USER1 specifies the comment criteria 430 (adequacy rule 54). In this example, the comment criteria for TRIG1 is that a comment of >50 characters in length is required and which may be later satisfied via task 430, with no consequent actions 440.

USER1 defines a second comment rule TRIG2 for the document and selects all paragraphs in the document 410 as the scope of the data within the document 4Q2015RPT. USER1 then defines the comment rule TRIG2 420, the TRIG2 comment rule 52 stating that any paragraph deletion serves as the triggering event for TRIG2. USER1 then specifies the commenting criteria 430. According to TRIG2, deleting a paragraph requires a comment via a form with two fields: a text entry field 320 labeled "Explanation:" 310 with no specified adequacy rule, and a drop down list 320 labeled: "Discussed with:" 310 and providing the drop down choices from, e.g., a list of editors. For the consequent actions 440, USER1 can specify a consequent action of notifying the document owner. As noted above, various forms of rule creation tools may be utilized, including drop down menus, pick lists, etc. In a simplistic system, the rules can simply be typed in a field according to a predefined syntax.

The above process 400 describes the specification of the scope of data, the trigger and adequacy rules, and subsequent actions in a document by a document creator or one with the proper authorization.

Turning now to the modification of the document, as described in FIG. 2, USER2 wishes to modify the 4Q2015RPT. She edits a number in a table, and edits text, but since this does not meet with either the TRIG1 or TRIG2 criteria, the mandatory commenting is not triggered. However, USER3 edits a number in text, which triggers the TRIG1 criteria. As soon as the action is concluded (e.g., USER3 types a space or makes some other concluding gesture) TRIG1 is tripped. The mandatory comment window 300 appears, and USER3 enters a comment "Updated to current value". USER3 clicks "Save Comment" 330. The system rejects this comment because it is <50 characters in length (the user may be informed as to the nature of the deficiency in their comment so that a proper comment can be provided—additionally, such instructions may be provided in advance, e.g., "must be >=50 characters". USER3 then reenters the comment, "The class action settlement reduced the number of outstanding litigation cases to this value." USER3 clicks "Save Comment" 330 and is able to continue working with the changes made and the comment stored with the change.

USER3 then highlights a paragraph (concerning the now past class action case) and selects "Delete" from a pop-up menu 250. This action trips TRIG2. The mandatory comment window appears with the two fields, as defined by USER1. USER3 completes the form: entering a comment "Case closed" and selecting another user's name from the dropdown list. USER3 clicks "Save Comment" 330, and the paragraph is deleted. A notification is then sent to the document owner (USER1).

TABLE OF REFERENCE CHARACTERS

| | |
|---|---|
| 10 | document editing system |
| 20 | server |
| 30 | client/editor |
| 35 | graphical user interface |
| 37 | productivity software program (executable) |
| 40 | non-volatile document store |
| 42 | data items |
| 50 | rules database |
| 52 | trigger rules |
| 54 | adequacy rules |
| 60 | comment store |
| 62 | comments |
| 70 | link store |
| 72 | links |
| 100-180 | flowchart and process elements |
| 200 | display screen |
| 210 | productivity software program (display) |
| 220 | spreadsheet document |
| 230 | selected data item (spreadsheet column) |
| 240 | cell |
| 250 | menu of available commands |
| 260 | requested action (delete column) |
| 265 | requested action (insert column right) |
| 300 | comment request/dialog window |
| 310 | message |
| 320 | comment entry field |
| 330 | comment save element (button) |
| 410 | user selects data item |
| 420 | user selects/defines comment rule |
| 430 | user selects/specifies comment criteria |
| 440 | user selects/specifies consequent actions |

What is claimed is:

1. A method for specifying a mandatory comment, comprising:
   receiving a definition of an actionable data item within a document;
   receiving a definition of a comment rule related to an action by a user on the actionable data item within the document,
   wherein the comment rule specifies conditions under which a mandatory comment is demanded of the user when the user adds, changes, or deletes information associated with the actionable data item within the document;
   receiving a definition of a comment criteria associated with the comment rule; and
   storing the actionable data item within the document, the comment rule, and the comment criteria in a non-volatile storage device of a hardware device.

2. The method of claim 1, further comprising receiving a specification of a consequent action to perform that is related to the comment.

3. The method of claim 2, wherein the consequent action is notifying at least one of an owner(s) of the document or other user(s) interested in the document.

4. The method of claim 1, wherein the comment rule comprises adequacy criteria.

5. The method of claim 4, wherein the adequacy criteria is an attribute of an entered comment.

6. The method of claim 4, wherein the adequacy criteria is based on content of an entered comment.

7. The method of claim 4, wherein the adequacy criteria is context dependent.

8. The method of claim 1, further comprising:
   receiving a second selection of a data item of the document;
   receiving a second definition of a comment rule related to an action on the data item; and
   receiving a second definition of a comment rule associated with a triggering criteria.

9. A system for specifying a mandatory comment, wherein the system is configured to carry out actions comprising:
   receiving a definition of an actionable data item within a document;
   receiving a definition of a comment rule related to an action by a user on the actionable data item within the document,
   wherein the comment rule specifies conditions under which a mandatory comment is demanded of the user when the user adds, changes, or deletes information associated with the actionable data item within the document;
   receiving a definition of a comment criteria associated with the comment rule; and
   storing the actionable data item within the document, the comment rule, and the comment criteria in a non-volatile storage device of a hardware device.

10. The system of claim 9, configured to carry out further actions comprising receiving a specification of a consequent action to perform that is related to the comment.

11. The system of claim 10, wherein the consequent action is notifying at least one of an owner(s) of the document or other user(s) interested in the document.

12. The system of claim 9, wherein the comment rule comprises adequacy criteria.

13. The system of claim 12, wherein the adequacy criteria is an attribute of an entered comment.

14. The system of claim 13, wherein the adequacy criteria is based on content of an entered comment.

15. The system of claim 12, wherein the adequacy criteria is context dependent.

16. The system of claim 9, further comprising:
   receiving a second selection of a data item of the document;
   receiving a second definition of a comment rule related to an action on the data item; and receiving a second definition of a comment rule associated with the comment criteria.

* * * * *